United States Patent [19]

MacGregor

[11] 3,826,872

[45] July 30, 1974

[54] TRANSPARENT MULTIPLEXER COMMUNICATION TRANSMISSION SYSTEM

[75] Inventor: William W. MacGregor, Wellesley Hills, Mass.

[73] Assignee: Honeywell Information Systems Inc., Waltham, Mass.

[22] Filed: Jan. 2, 1973

[21] Appl. No.: 320,040

[52] U.S. Cl. ....... 179/15 A, 179/15 BA, 179/18 FG
[51] Int. Cl. ............................................ H04j 3/04
[58] Field of Search ....... 179/15 BA, 18 FF, 18 FG, 179/15 A; 340/172.5, 413

[56] References Cited

UNITED STATES PATENTS

| | | | |
|---|---|---|---|
| 3,466,397 | 9/1969 | Benowitz | 179/15 BA |
| 3,618,082 | 11/1971 | Feulner | 340/413 |
| 3,623,010 | 11/1971 | Burkhalter | 340/172.5 |
| 3,644,896 | 2/1972 | Chaddha | 340/172.5 |

*Primary Examiner*—David L. Stewart
*Attorney, Agent, or Firm*—Faith F. Driscoll; Ronald T. Reiling

[57] ABSTRACT

A communication multiplexing apparatus including scanning circuits and control circuits operatively couples an input/output data processing device to a plurality of input/output data units through a plurality of common interface lines for transmission and reception of data. The multiplexing apparatus is completely transparent to data processing device and input/output units as it recognizes no special characters within the data being transmitted. An input/output unit initiates a transmit operation by forcing a first control line to a predetermined state which causes scanning apparatus to stop when it encounters the line of the active unit. In accordance with the state of the scanning circuits, control circuits enable the control lines of the selected active input/output unit for a data transfer operation and disable the control lines of all remaining units. The multiplexing apparatus permits the data processing unit to initiate a transaction with an input/output unit by transferring all of the message signals transmitted by the data processing unit to each of the input/output units simultaneously. When the input/output recognizes its address within the message signals, it initiates a transmit operation by forcing the first control line to the predetermined state.

27 Claims, 13 Drawing Figures

TRANSPARENT MULTIPLEXER COMMUNICATION TRANSMISSION SYSTEM

BACKGROUND OF THE INVENTION

1. Field of Invention

This invention relates to data communication apparatus and more particularly to an improved multiplexing system in which data may be transmitted between a plurality of input/output terminal devices and a data processing unit.

2. Prior Art

In general, prior art systems which are arranged to establish communications between a plurality of terminal devices and a processing unit over a communications channel normally include circuits for recognizing control characters included within the information being transmitted. These control characters are used to signal and identify to the terminal devices, various control operations which include beginning to text, start of message, end of message, and end of transmission.

Generally, it has been found that requiring the multiplexing apparatus to detect when a data transmission has been completed as well as other control operations has several disadvantages. One disadvantage is that it increased the complexity of multiplexing apparatus since in addition to character recognizing control logic circuits, the apparatus must also include circuits for initiating the proper sequence of control signals in response to the control operation designated by the control characters of a message. A second disadvantage of such arrangements is that the multiplexing apparatus must expend additional time in generating these control signals and signalling the device of the operations it is to perform.

A further problem of the prior art systems is that in order to accommodate data transmission over a communications channel either directly or long distance via commercially available transmission lines, it may be necessary to modify the interface associated with the miltiplexing apparatus to be compatible with the communications channel interface. This in turn can increase the complexity of the multiplexing apparatus by requiring it also to adapt its interface to that of the input/output units.

Accordingly, it is a primary object of the present invention to provide a multiplexing apparatus which is transparent as to the information transmitted between the input/output units and the data processing unit.

Accordingly, it is a more specific object of the present invention to provide multiplexing apparatus which permits data transmission between a plurality of input/output terminal units and a data processing unit over available communication channels with a minimum increase in the complexity of the multiplexing apparatus.

SUMMARY OF THE INVENTION

The above and other objects of the present invention are achieved in a preferred embodiment of the present invention which comprises a multiplexing apparatus which couples a plurality of input/output terminal devices to a communications channel for accommodating bidirectional data transmission between the devices and a data processing unit coupled to the communications channel.

The multiplexing apparatus includes scanning means operative to scan the input control lines associated with each of the terminal devices until it senses an active line. In accordance with the state of the scanning means, control circuits selectively enale the lines of the active terminal device for transmission while at the same time inhibit the control lines of other terminal devices. This is effective to establish a channel between the active device which initiated the transaction and the data processing device. When the transaction is completed, the active device through certain control lines releases the scanning means causing it to resume scanning automatically until it encounters a further active control line, signalling that a further device wishes to initiate a transaction.

The multiplexing apparatus is arranged to couple all of the input/output terminal devices in common to receive the data transmitted by the processing unit. Thus, the data processing unit can initiate a transaction with a particular device simply by including its address in a message. The designated terminal device in response to its address is operative to activate its control line signalling that it is ready to engage in a transaction.

The arrangement of the present invention permits the utilization of common control circuits and like interfaces for the input/output devices and for the interface unit which couples to the communications channel. In addition to reducing the complexity of the multiplexing unit, the arrangement also enables transmission between the processing device and the plurality of input/output devices to be accomplished utilizing standard communication transmission procedures and communication interfaces.

The scanning means of the multiplexing apparatus includes a counter arranged to address each of the channels in sequence. Alternate counts of the counter are assigned to the number of channels required for each of the terminal devices which are to communicate with the data processing unit. This arrangement provides for highly reliable operation in that it prevents the possibility of time overlap between sequentially addressed channels.

The multiplexing apparatus derives its power directly from the input power line and uses the power derived signals to establish the rate at which the control input lines of the input/output devices are scanned. In addition to minimizing further the complexity of the multiplexing apparatus, this arrangment inhibits automatically the establishment of communications between any of the input/output devices when the multiplexing unit is not switched on for operation. Additionally, the multiplexing apparatus is arranged to operate in both a normal mode and a test mode which provides for offline testing of the various parts of the multiplexing unit.

The novel features which are believed to be characteristic to the invention both as to its organization and method of operation, together with further objects and advantages thereof will be better understood from the following description considered in connection with the accompanying drawings. It is to be expressly understood, however, that these drawings are for the purpose of illustration and description only and are not intended as a definition of the limits of the present invention.

DESCRIPTION OF THE PREFERRED EMBODIMENT

Figure 1:
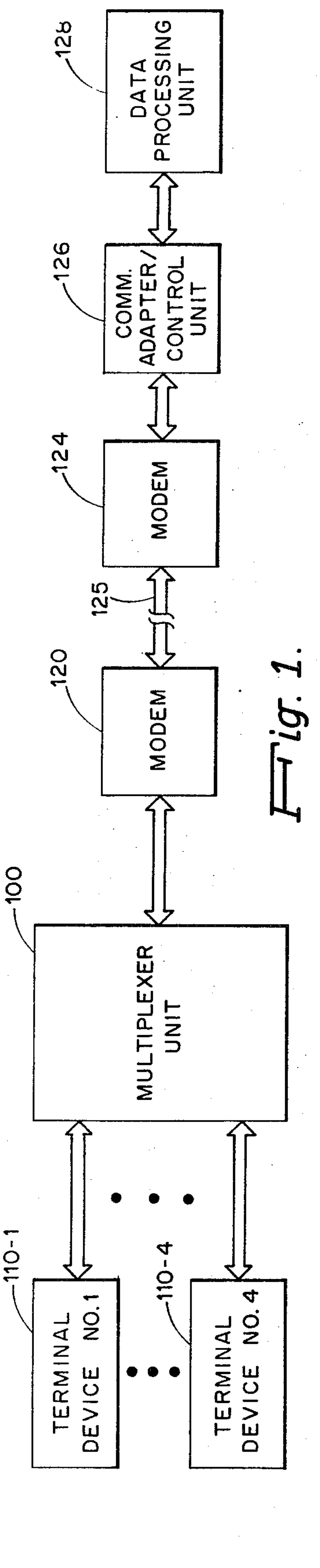
FIG. 1 shows in block diagram form a system which incorporates the present invention.

FIG. 1 shows in block diagram form a data communication system for transmitting information between a data processing unit 128 and plurality of input/output terminals devices 110-1 through 110-4. As seen from the Figure, transmission takes place via a communications channel 125 by means of a communication adapter/control unit 126, a data modem 124, a data modem 120 and a multiplexer unit 100.

The data processing unit 128 in the preferred embodiment is any conventional central processing unit arranged to communicate with a communication adapter or control unit, conventional in design, via the data modem 124. For example, the data processing unit 128 and adapter 126 respectively may take the form of the central processor described in the publication titled "Series 200, Summary Description" dated June, 1970, published by Honeywell Inc., and the adapter described in the publication titled "281-1H/285-1H Communication Control Adapter" dated October, 1967, published by Honeywell Inc.

Communication between the data processing unit 128 and the plurality of terminal devices coupled to multiplexer unit 100 proceeds through the data modems 124 and 120 in a conventional manner via telephone lines, corresponding to channel 125, connected to either a private or switched network. The modems 120 and 124 respectively are operative to convert the voltage level signals of the multiplexer unit 100 and adapter/control unit 126 into signals suitable for transmission over the transmission line network 122. The modems 120 and 124 are conventional in design and may take the form of the data sets described in a publication titled "Bell System Communications Technical Reference for Data Sets - 201A and 201B Interface Specifications," dated Sept. 1962, published by the American Telephone and Telegraph Company.

Although not shown in FIG. 1, each of the modems 120 and 124 in a switched network are assumed to be coupled to the communications channel 125 through a data coupler or access unit, conventional in design. These units may make the form of the data couplers described in a publication titled "Bell System Data Communications Technical Reference-Data Couplers CBS and CBT for Automatic Terminals" dated Aug. 1970, published by the American Telephone and Telegraph Company.

It will be noted that while FIG. 1 discloses a modem-connect system arrangement, that the multiplexer unit 100 of FIG. 1 can also be arranged to connect a modem-bypass system arrangement. Accordingly, in such an arrangement, the multiplexer unit 100 connects directly to the communication adapter or control unit 126. The various modes in which the multiplexer unit 100 can operate will be described in greater detail with reference to FIGS. 2 and 3j.

Figure 2A:
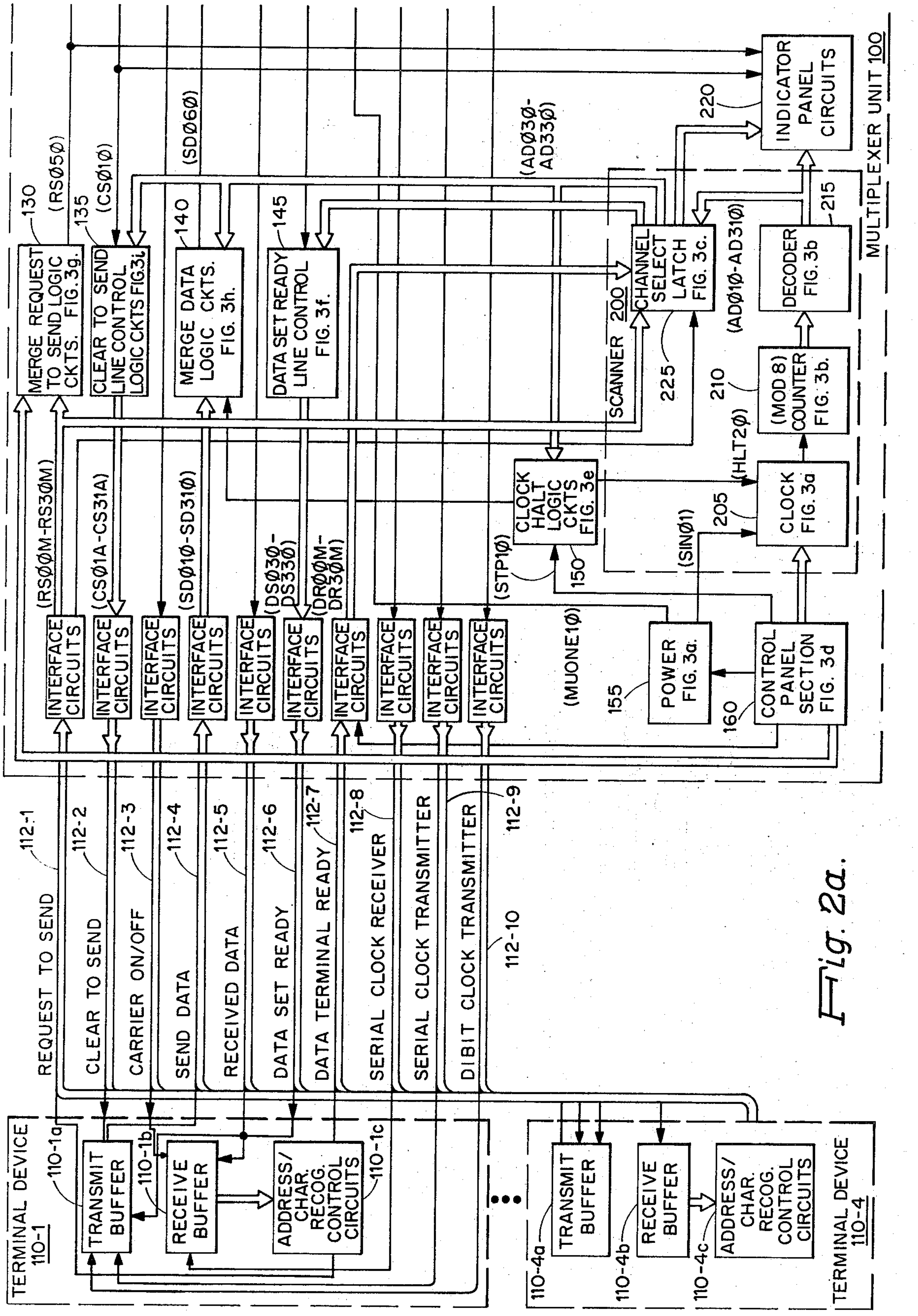
FIG. 2 shows in greater detail the different sections which comprise the multiplexer unit of the system of FIG. 1.
Figure 2B:
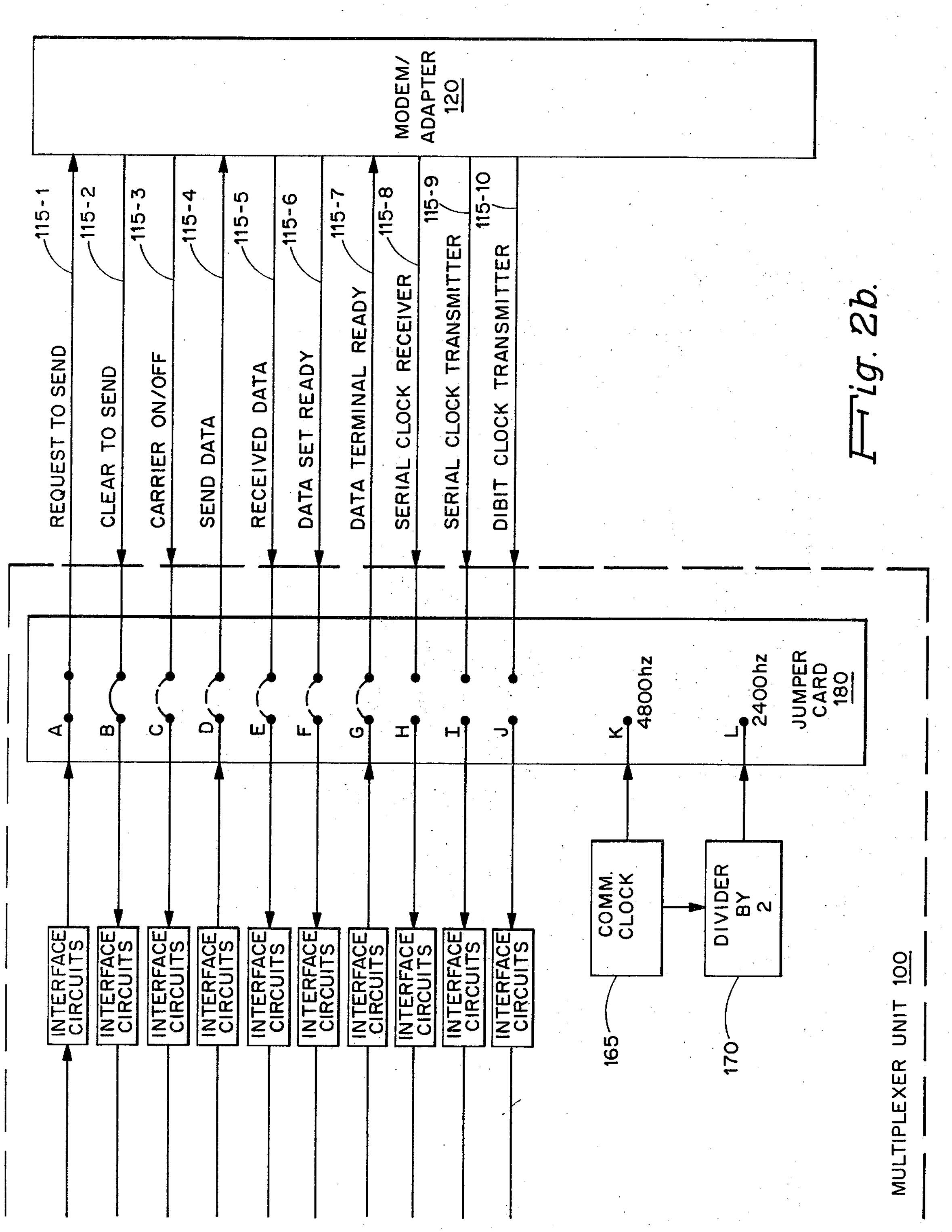

Referring now to FIG. 2, there is shown in greater detail the terminal devices 110-1 through 110-4 and the multiplexer unit 100 of the present invention. From the Figure, it is seen that the multiplexer unit 100 couples to the plurality of terminal devices 110-1 through 110-4 through a group of signal lines 112-1 through 112-10. In the preferred embodiment, the devices take the form of conventional data entry equipment such as cathode ray tube display devices. Each of the terminal devices includes storage and control circuits for transmission and receiving messages. The terminal devices, by way of example, each include a transmit buffer register (e.g., 110-12) for storing messages to be transmitted via a SEND DATA output line and a receive buffer register (e.g, 110-1*b*) for storing messages received from a RECEIVED DATA line. Also, each device includes address and character recognition and control circuits such as 110-1*c* for sensing address and control characters being transmitted for display. Similarly, the multiplexer unit 100 couples to the modem 120 via a plurality of signal lines 115-1 through 115-10 arranged like those which couple the terminal devices to the multiplexer unit 100. A table herein summaraizes the functions of the common interface signal lines.

TABLE

INTERFACE SIGNAL LINES

| NAME | DESCRIPTION |
|---|---|
| DATA TERMINAL READY | These lines are active whenever the power is applied to the multiplexer unit |
| CARRIER ON/OFF | Do. |
| *SERIAL CLOCK RECEIVE | Do. |
| *DIBIT CLOCK TRANSMIT | Do. |
| *SERIAL CLOCK TRANSMIT | Do |
| RECEIVED DATA | Do. |
| SEND DATA | A single line carrying the data. |
| REQUEST TO SEND | A signal from a terminal device indicating that it has data to transmit. |

TABLE-Continued

INTERFACE SIGNAL LINES

| NAME | DESCRIPTION |
|---|---|
| CLEAR TO SEND | The signal on this line constitutes a response to a signal on a Request to Send line from one of the terminal devices. |
| DATA SET READY | Provides a positive voltage potential (i.e., +6 volts) at all times during which the modem 120 is prepared to send or receive data. A 0-volt level indicates the modem 120 is off. |

*Synchronous modems only.

Both the groups of signal lines 112-1 through 112-10 and signal lines 115-1 through 115-10 pass through a corresponding number of interface circuits and thereafter are applied through the various sections of the multiplexer unit 100 as shown. These interface circuits comprise conventional driver and receiver circuits which are operative to provide bipolar voltage levels for all signals external to the unit 200 in addition to converting the external signals to voltage levels suitable for application to the different sections of multiplexer unit 100. More particularly, the external control voltage signals representative of a binary ONE and binary ZERO correspond to voltage levels of 10 volts and −10 volts respectively. The voltage levels for the external data signals corresponding to a binary ONE and binary ZERO are the reverse of the control signals. The internal voltage signals representative of a binary ONE and a binary ZERO correspond to 3.5 volts and 0 volts respectively. Thus, the interface circuits perform the necessary level shift in voltage for internal and external voltage signals.

In addition to the interface circuits mentioned, the multiplexer unit 100 includes a Merge Request To Send Logic Circuit Section 130, a Clear To Send Line Control Logic Section 135, a Merge Data Logic Section 140, a Data Send Ready Line Control Section 145, a Clock Halt Logic Section 150, a Communication Clock Section 165, a Divider Section 170, a Jumper Section 180 and a Scanner 200. The Scanner Section 200 includes a clock 205, a counter 210, a decode circuit 215, an Indicator Panel Circuits 220 and Channel Select Latch Circuits 225.

The clock 205, counter 210, decoder 215 and channel select latch circuits 225 together are operative to scan sequentially the REQUEST TO SEND lines of devices 110-1 through 110-4 and stop when an active line is sensed and then resume scanning after a transaction involving one of the terminal devices and the data processing unit has taken place. More particularly, when the multiplexer unit 100 is operating in a run mode, as explained herein, the channel select circuit of an active channel switches to a binary ONE state when the following input conditions are met: the REQUEST TO SEND line is in a binary ONE state, the scanner 200 presents an address selection signal for sampling the channel whose REQUEST TO SEND line is in a binary ONE state and the DATA TERMINAL READY line associated with that channel is also in a binary ONE stage. At that time, the latch circuit conditions the scanner 200 to stop scanning. The latch circuit remains in a binary ONE state until both the DATA TERMINAL READY line and REQUEST TO SEND lines are forced to binary ZERO states.

Figure 3A:
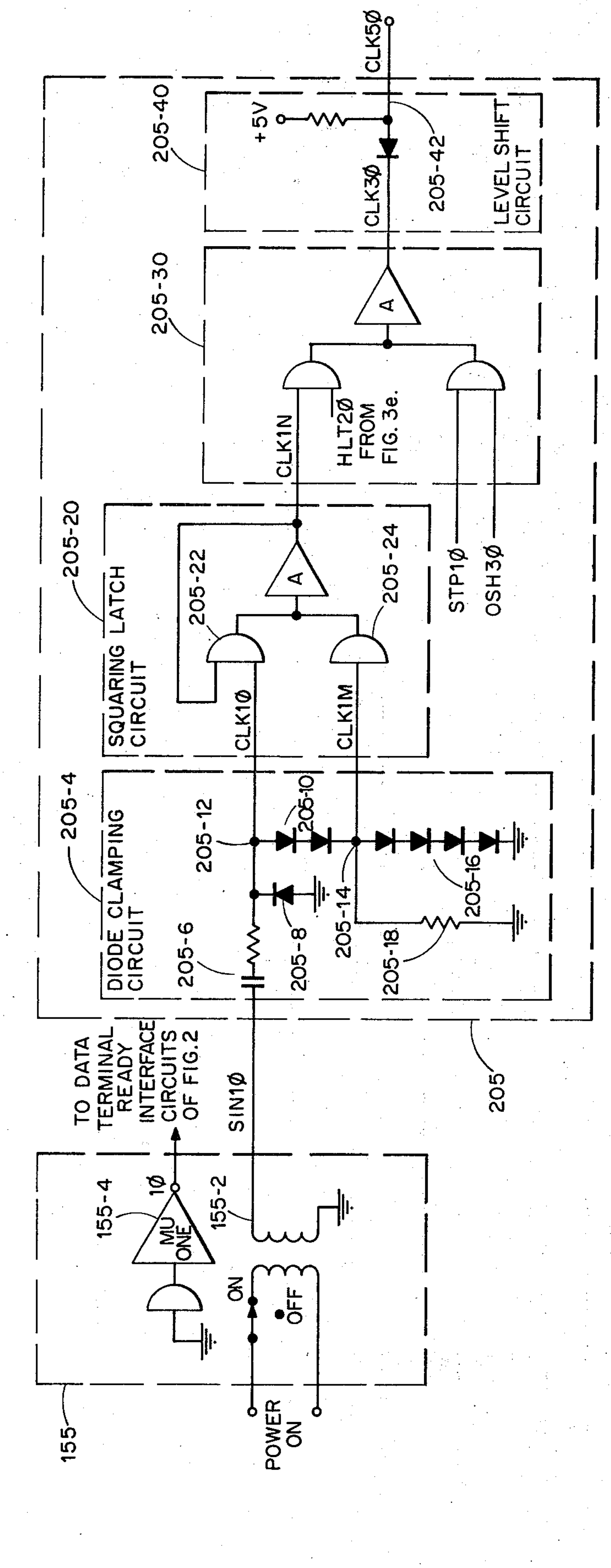
FIG. 3*a* discloses in greater detail the Power and Clock Circuit Sections included within the multiplexer unit of FIG. 2.

POWER AND CLOCK SECTIONS - FIG. 3*a*

Considering the elements of the scanner 200 in greater detail reference is first made to FIG. 3*a*. This Figure discloses the clock circuit which provides the basic timing for multiplexer unit 100. As seen from FIG. 3*a*, the timing clock signal CLK50 is derived directly from the input power line. When power is applied to the multiplexer unit 200, the sine wave signal, sin 1$\phi$, coupled from a secondary winding 155-2 of the power transformer is applied to a diode clamping circuit 205-4. Additionally, the application of power to the multiplexer unit 200 causes a gate and inverter circuit 155-4 to provide a binary ONE signal to the Data Terminal Ready interface circuits of FIG. 2 (i.e., forces signal MUONE1$\phi$ to a binary ONE). This binary ONE signal informs the communication equipment included in the modem or adapter 120 that the multiplexer unit 200 is ready to transmit or receive data.

The diode clamping circuit 205-4 includes an input resistor-capacitor network 205-6, a clamping diode 205-8, a resistor 205-18 and two groups of series connected diodes 205-10 and 205-16, arranged as shown. The circuit 205-4 generates two clocking signals CLK1$\phi$ and CLK1M to have a predetermined phase relationship to one another. In particular, the group of two diodes 205-10 causes signal CLK1$\phi$ at junction 205-12 to switch to a binary ONE before signal CLK1M switches to a binary ONE and to remain in a binary ONE after the signal CLK1M switches to a binary ZERO. The pair of signals CLK1$\phi$ and CLK1M at junctions 205-12 and 205-14 are applied respectively to a set gate 205-22 and a recirculation AND gate 205-24 of a latching circuit 205-20.

The circuit 205-20 in response to signals CLK1$\phi$ and CLK1M produces a 60 hertz square wave signal which is applied to a gate amplifier circuit 205-30. When a control signal HLT2$\phi$ is a binary ONE, the circuit 205-30 applied the clocking signal CLK3$\phi$ as an input to a level shifting circuit 205-40. The circuit 205-40 produces a signal CLK5$\phi$ at junction 205-42 whose amplitude is a one diode voltage drop more positive than signal CLK3$\phi$.

As described herein, the control signal HLT2$\phi$ inhibits the generation of signal CLK5$\phi$ either when the scanner 200 detects the presence of an active channel or when a particular one of the switches of the Control Panel Section 160 is placed in the STOP position which forces a control signal STP1$\phi$ to a binary ONE. In this instance, the signal CLK5$\phi$ is generated only in response to a timing signal OSH3$\phi$ which is derived from depressing another one of the switches included in Control Panel Section 160.

Figure 3B:
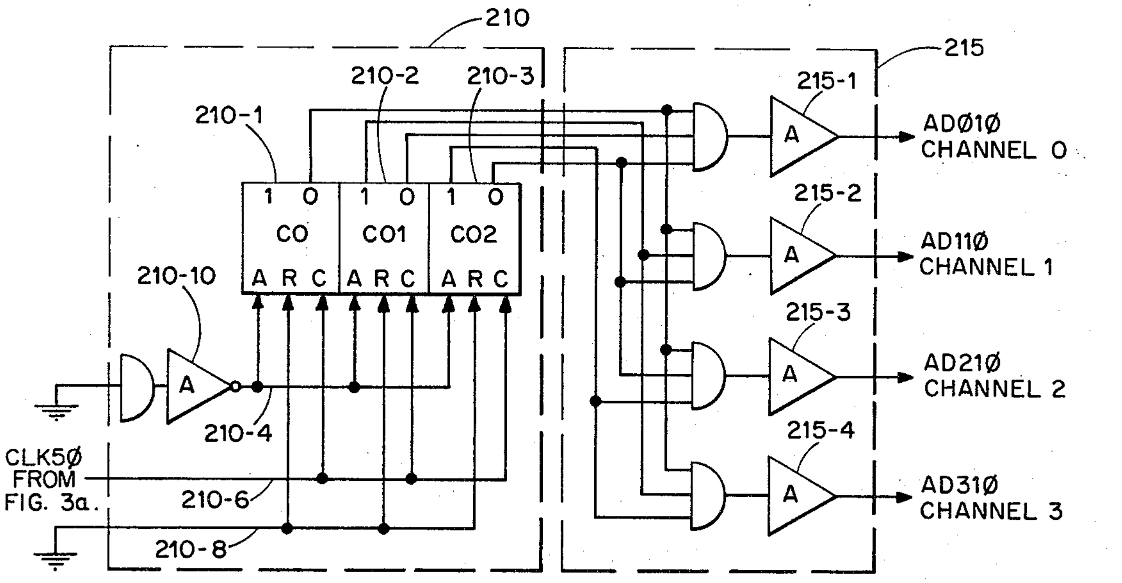
FIG. 3*b* shows in greater detail the counter and the decoder logic circuits which are included within the Scanner of the multiplexer unit of FIG. 2.

COUNTER AND DECODER SECTIONS - FIG. 3*b*

These sections generate channel address selection signals used to detect the presence of an active terminal device. Referring to FIG. 3*b*, it is seen that the counter 210 includes three series connected binary flip-flop stages 210-1 through 210-3 arranged to be incremented from a count of zero through seven. The counter 210 is incremented by one in response to each occurrence of clocking signal CLK5$\phi$ which is applied to the clock input clock terminal C of each stage. To accomplish the continuous incrementing of counter 210 by signal CLK5ϕ, an Advance input to each stage is fixed at a voltage level representative of a binary ONE by holding an input terminal of gate-inverter circuit 210-10 at a binary ZERO. Also, each of the reset input terminals of the counter stage is held at a binary ZERO, inhibiting the resetting of counter 210.

The binary ONE and binary ZERO output signals from the stages of counter 210 are combined as shown and applied to the AND gate and amplifier circuits 215-2 through 215-4 of the decoder 215. To prevent the possibility of signal overlap or race conditions, each of the decoder output channel address signals ADϕ10 through AD31ϕ are separated in time by arranging the decoder to decode the alternate counts produced by counter 210 (i.e., counts of zero, two, four and six).

Figure 3J:
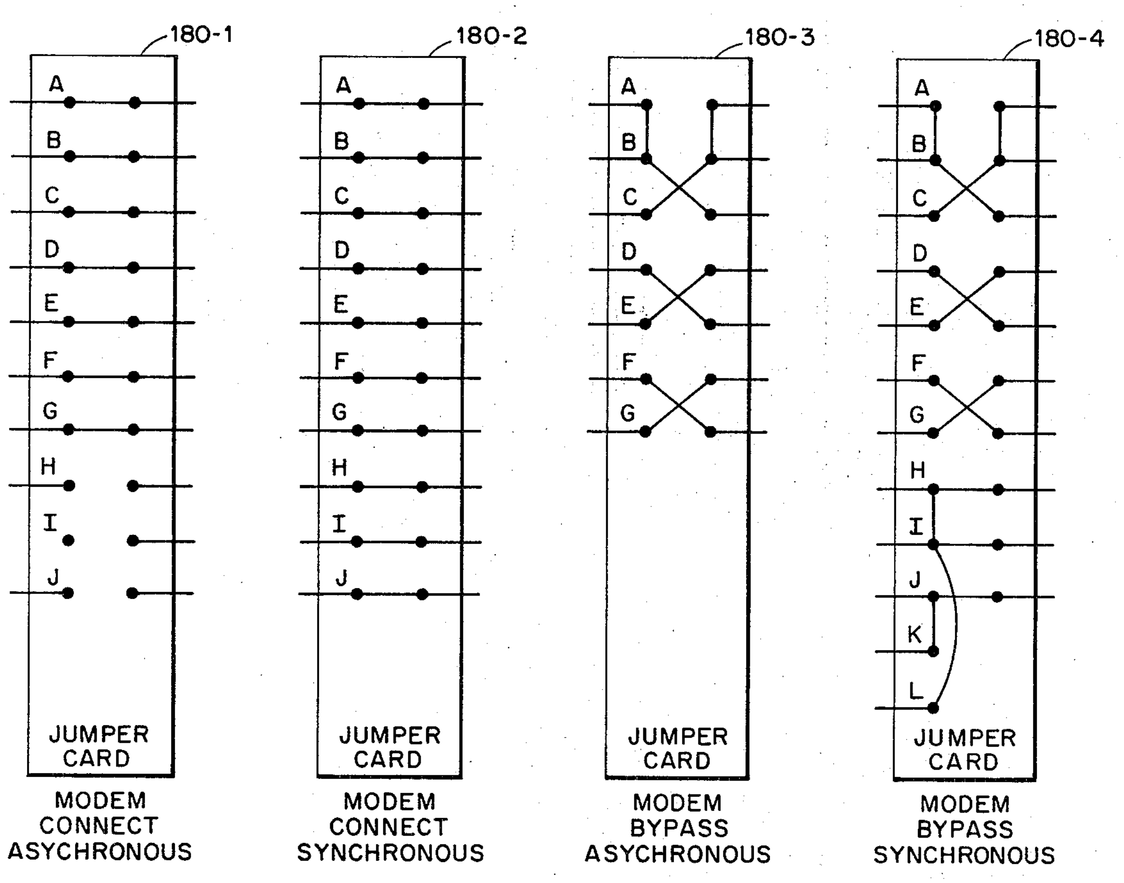
FIG. 3*c* shows in greater detail the Channel Select Latching Circuit Section of FIG. 2.
FIG. 3*d* shows in greater detail, circuits for generating control signals in response to Control Panel Section of the multiplexer unit of FIG. 2.
FIG. 3*e* shows in greater detail the Clock Halt Logic Section of FIG. 2.
FIG. 3*f* shows in greater detail the Data Set Ready Line Control Section of FIG. 2.
FIG. 3*g* shows in greater detail the Merge Request To Send Logic Circuit Section of FIG. 2.
FIG. 3*h* shows in greater detail the Merge Data Logic Circuit Section of FIG. 2.
FIG. 3*i* shows in greater detail the Clear To Send Logic Control Section of FIG. 2; and, FIG. 3*j* shows the various jumper card connections for different modes of operation for the multiplexer unit of FIG. 2.
Figure 3C:
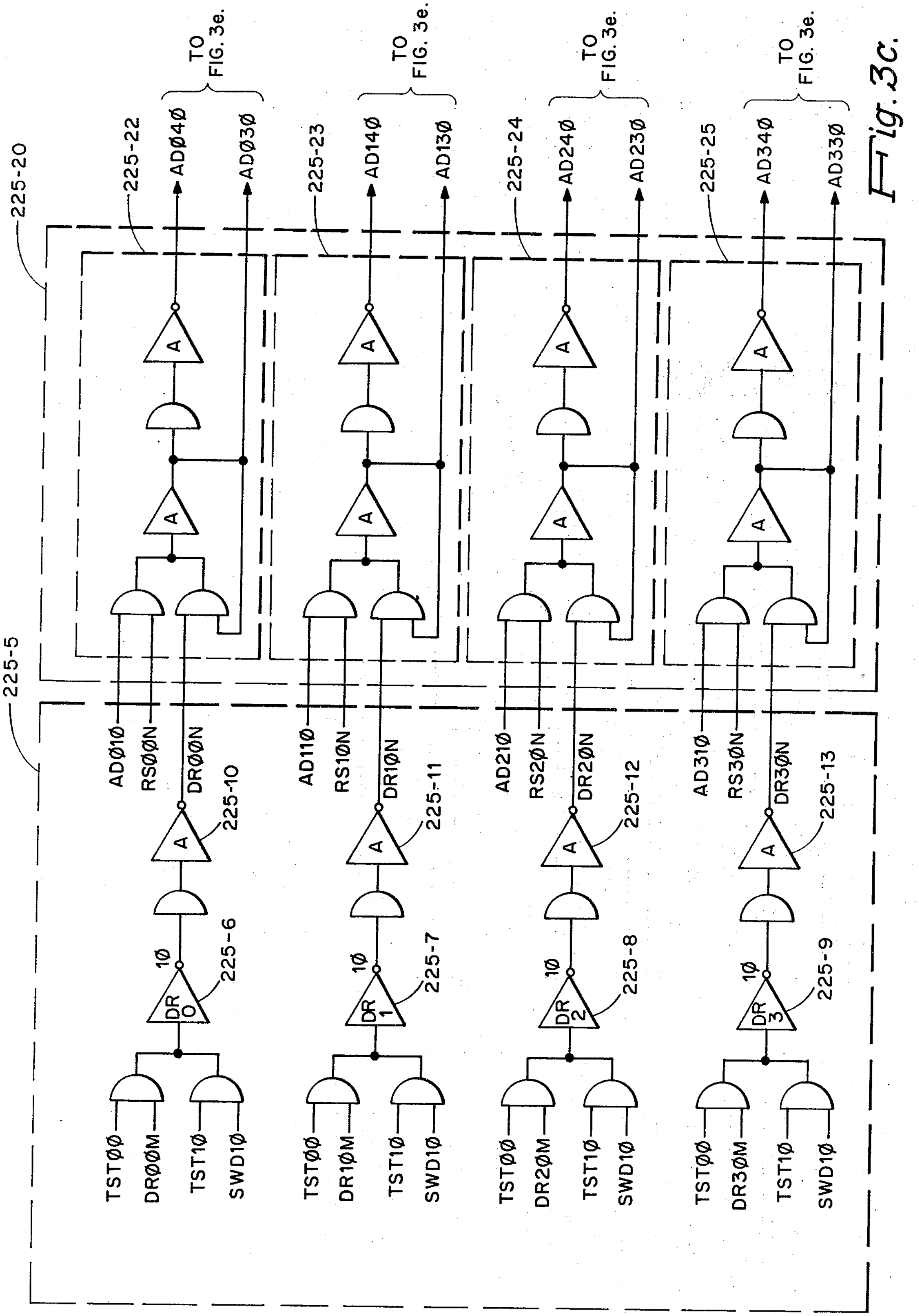

CHANNEL SELECT LATCH SECTION - FIG. 3*c*

This section enables the multiplexer unit 100 to compare the decoder output signals with the states of the REQUEST TO SEND lines and store an indication of the comparison. When one of the four channels is to be connected for data transmission, the section conditions the multiplexer unit 100 to stop scanning by generating a halt control signal. The section 225 includes four amplifier latch circuits 225-22 through 225-25, one for each channel. Each latch circuits receives a different one of the channel address signals ADϕ10 through AD31ϕ and a corresponding one of the signals applied to the REQUEST TO SEND lines (i.e., one of the signals RsϕϕN through RS3ϕN). Also, each latch circuit receives a corresponding one of the signals applied to DATA TERMINAL READY lines (i.e., signals DRϕϕN through DR3ϕN) by the terminal devices 110-1 through 110-4.

The signals applied to both the REQUEST TO SEND and DATA TERMINAL READY lines are arranged as shown to be selectively gated with control signals TSTϕϕ, TST1ϕ and SWD1ϕ, derived from a MODE switch located on the Control Panel Section 160. This arrangement permits an operator to generate the signals on the REQUEST TO SEND and DATA TERMINAL READY lines for test purposes when the multiplexer unit 200 is placed in a test mode, by an operator as described herein. In greater detail, the OR gate and inverter circuits 225-6 through 225-9 of input section 225-5 combine corresponding ones of the signals from the DATA TERMINAL READY lines (i.e., signals DRϕϕM through DR3ϕM) generated by the devices 110-1 through 110-4 with the test control signal TST1ϕ. Also, the complement of the signal TSTϕϕ, is combined with a DATA TERMINAL READY signal, SWD1ϕ, generated from depressing one of the switches of Section 160. The resulting signals DRϕ1ϕ through DR31ϕ are inverted by gate and inverter circuits 225-10 through 225-13 respectively and applied to the holding gate circuits of the channel latch circuits as shown.

In operation, when one of the Terminal Devices forces a REQUEST TO SEND signal to a binary ONE state, during normal operation (i.e., when signal TSTϕϕis a binary ONE), it causes the corresponding one of the latch circuits to be switched from a binary ZERO to a binary ONE when the channel assigned to the device is addressed (i.e., a corresponding one of the signals ADϕ1ϕ through AD31ϕ is a binary ONE) and when the terminal device has switched its DATA TERMINAL READY signal line to a binary ONE state. The channel latch circuit remains in its ONE state and the channel remains connected until the terminal device forces the DATA TERMINAL READY signal to a binary ZERO. This switches the latch circuit from a binary ONE to a ZERO thereby releasing the channel.

INDICATOR PANEL CIRCUITS

As seen from FIG. 2, the Indicator Panel Circuits 220 display for the convenience of testing by an operator, the states of output signals from the decoder 215, the Channel Select Latch Section 225, the Merge Request To Send Logic Section 140 and the Interface Circuits which couple to the CLEAR TO SEND line from the unit 120. The circuits, not shown, are conventional lamp driver circuits which are arranged to condition indicator lamps for displaying the states of signals ADϕ1ϕ through AD31ϕ, signals ADϕ3ϕ through AD33ϕ, signals RSϕ5ϕ and CSϕ1ϕ.

Figure 3D:
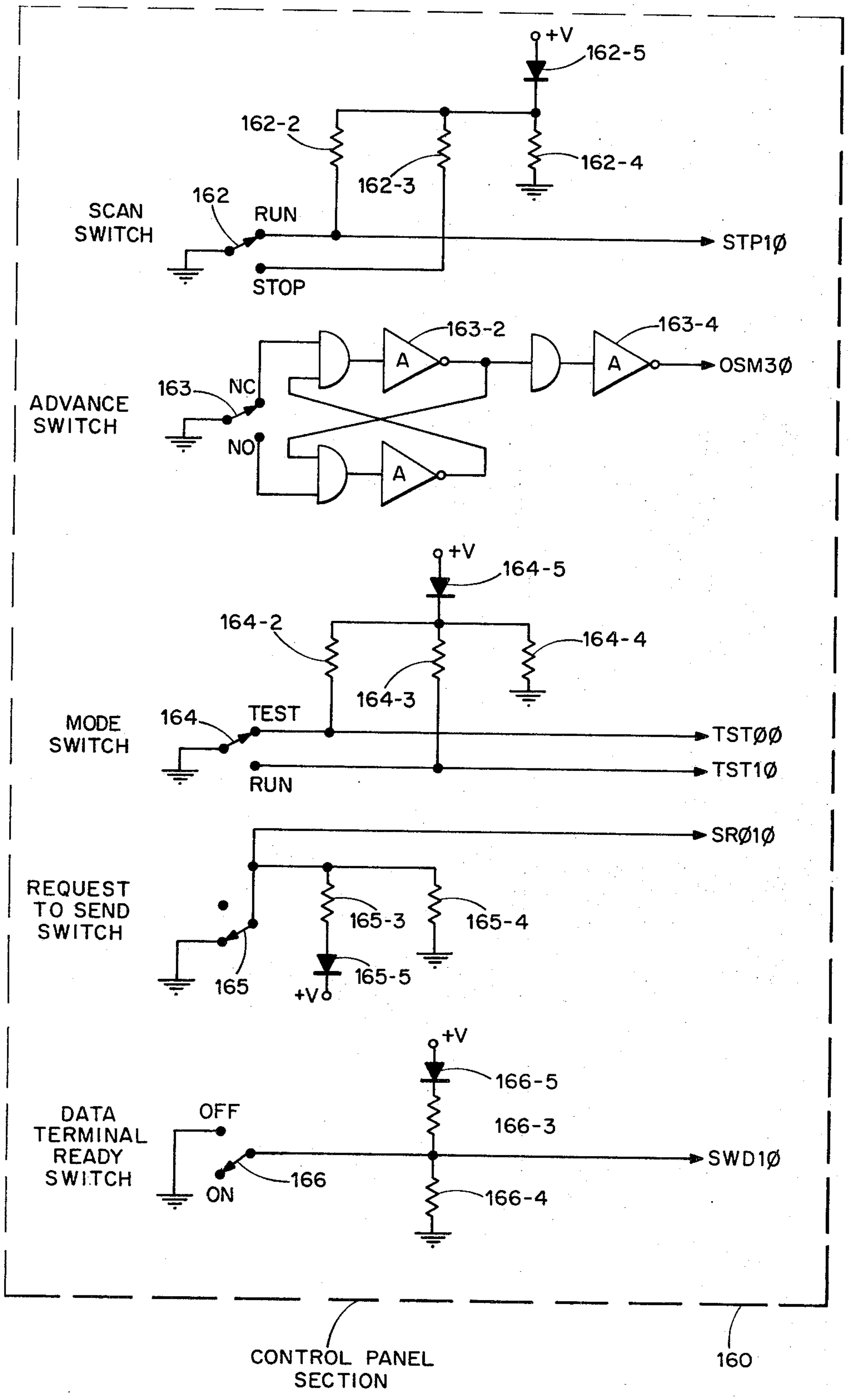

CONTROL PANEL SECTION - FIG. 3*d*

The FIG. 3*d*, illustrates a number of control panel switches 162 through 133 and associated circuits of Section 160. As shown, the switches 162 and 164 each include a plurality of current limiting resistors (e.g. 162-2, 162-3 and 162-4) and a diode connected in series to a supply voltage source, +V. The switches 165 and 166 each are arranged in a similar fashion to include a pair of current limiting resistors and a series diode.

With the exception of the ON-OFF power switch 161 as shown in FIG. 3*a*, the remaining switches are normally used by an operator to test the various sections of the multiplexer unit 200 to determine whether they are operating properly. The SCAN switch 162, when placed in the STOP position as mentioned previously, inhibits the operation of the Clock Section 205 and enables an operator to cycle the counter 210 manually via an ADVANCE pushbutton switch 163. The switch 163 when depressed momentarily switches a latch circuit 163-2 from a binary ONE to a binary ZERO and from a binary ZERO to a binary ONE. The signal produced by latch circuit 163-2 is inverted by an inverter circuit 163-4 to produce timing signal OSH3ϕ which is applied to the Clock Section 205.

The MODE switch 164 when placed in the TEST position forces signals TSTϕϕ and TST1ϕ to a binary ZERO and a binary ONE respectively. These signals condition the various sections of the multiplexer unit 200 so as to enable testing of the unit 100 using the REQUEST TO SEND switch 165 and the DATA TERMINAL READY switch 166. When the MODE switch 164 is placed in the RUN position, the control signals are generated by the terminal devices 110-1 through 110-4 during normal operation.

Various tests are performed by an operator off-line by removing the jumper card section 180 of FIG. 1 so as disconnecting all of the interface circuits from the terminals A through J. For example, after an operator has verified that each of the control panel switches are operating properly, the operator can place the SCAN switch in the STOP position and the MODE switch in the TEST position. By momentarily depressing the DATA TERMINAL READY pushbutton and depressing and releasing the ADVANCE pushbutton switch, an operator can observe the sequential selection and displaying of the channel addresses by the Indicator Panel Circuits 220. This verifies that the sections 155, 205, 210 and 215 are functioning properly.

The operator can then proceed to check the operation of other sections, as for example, the Channel Select Latch Section 225 by first selecting a channel address, in the manner just desribed, then depressing the REQUEST TO SEND pushbutton switch and observing that the appropriate lamp indicator is switched on by the Indicator Panel Circuits 220 and then is switched off upon momentary depression of the DATA TERMINAL READY pushbutton switch. The other channel addresses can be selected in the same manner to complete the testing of section 225.

Figure 3E:
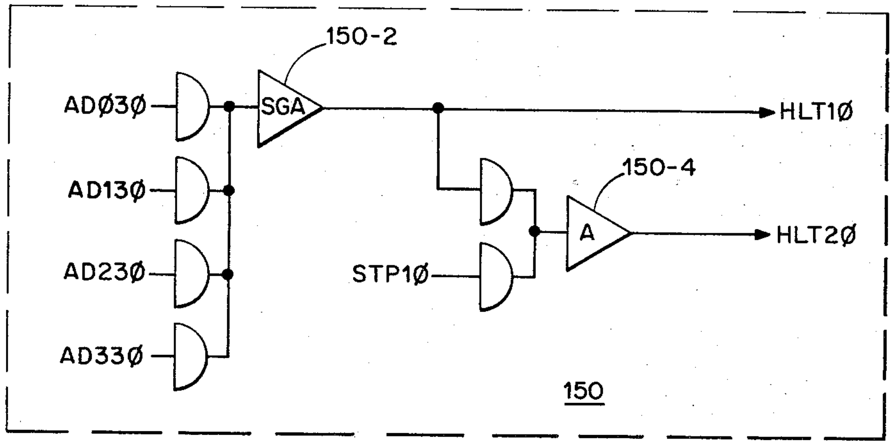

CLOCK HALT LOGIC CIRCUIT SECTION - FIG. 3*e*

The section 150 includes an OR gate and amplifier circuit 150-2 which connects in series with an OR gate and an inverter circuit 150-4 as shown in FIG. 3*e*. This section is operative to inhibit operation of the Clock Section 205 when either one of the four channels has been selected (i.e., one of the signals ADϕ3ϕ through AD33ϕ is a binary ONE) or when the SCAN switch on the Control Panel Section 160 is in the STOP position (i.e., signal STP10 is a binary ONE). This causes gate and inverter circuit 150-4 to switch signal HLT2ϕ from a binary ONE to a binary ZERO. The signal HLT1ϕ is forwarded to the Merge Data Send Section of FIG. 3*h* where it is used to control the transfer of data signals between one of the terminal devices 110-1 through 110-4 and modem 120.

Figure 3I:
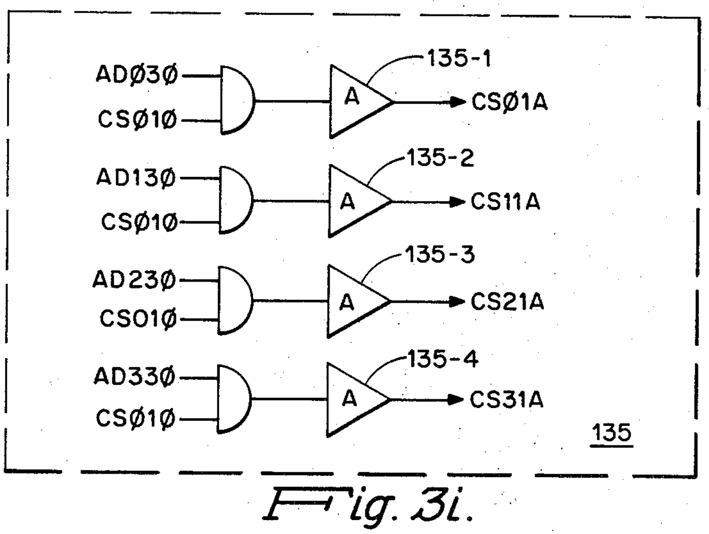
Figure 3H:
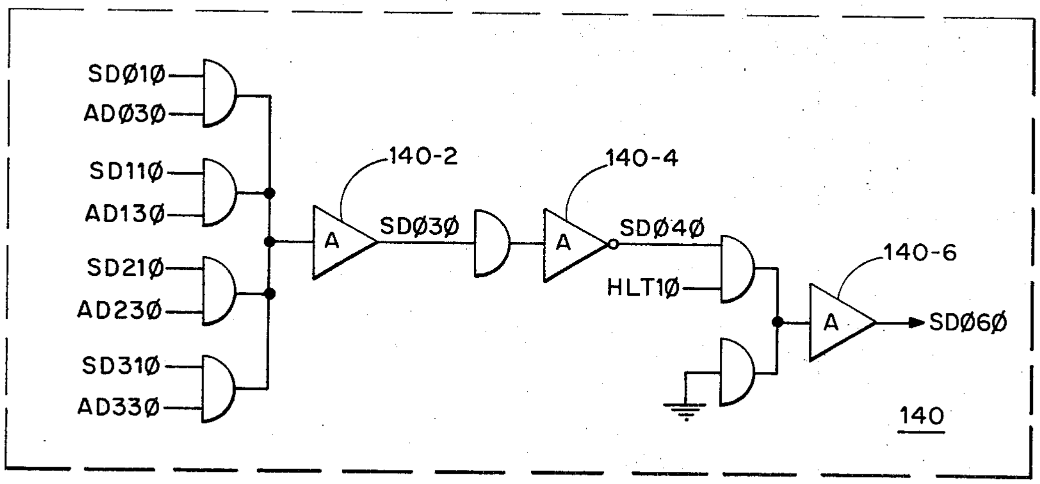
Figure 3F:
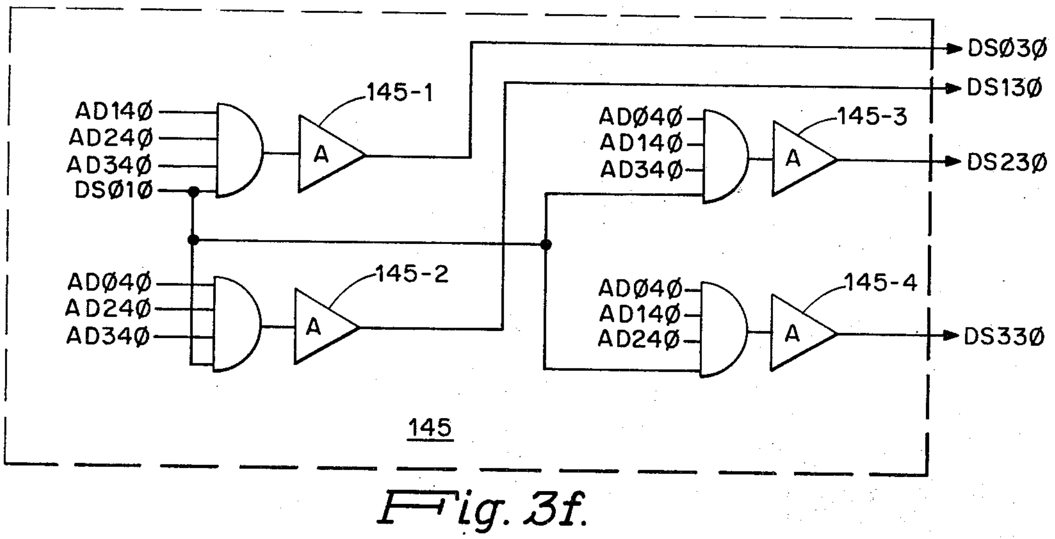

DATA SET READY LINE CONTROL - FIG. 3*f*

The section 145 combines different sets of the channel address signals from the channel Select Latch Section 225 via a group of AND gate and amplifier circuits 145-1 through 145-4 and gates each set with a signal applied to the DATA SET READY line by the Modem/Adapter unit 120. The state of this line indicates the status of the local modem 120 to the multiplexer unit 100. When signal DSϕ1ϕ is a binary ONE, it conditions the AND gate and amplifier circuit of a selected channel to switch the corresponding DATA SET READY line of the connected terminal device to a binary ONE notifying the device that the modem 120 is ready to initiate a transaction. At the same time, the remaining lines are held at binary ZEROS.

When the modem 120 is not ready to initiate a transaction (i.e., it is turned off), the signal DSϕ1ϕ is a binary ZERO and therefore the section 145 inhibits all of the circuits 145-1 through 145-4 from forcing any one of the signals DSϕ3ϕ through DS33ϕ to a binary ONE. This signals the terminal device of the connected channel that the modem 120 is not ready to initiate a transaction.

Figure 3G:
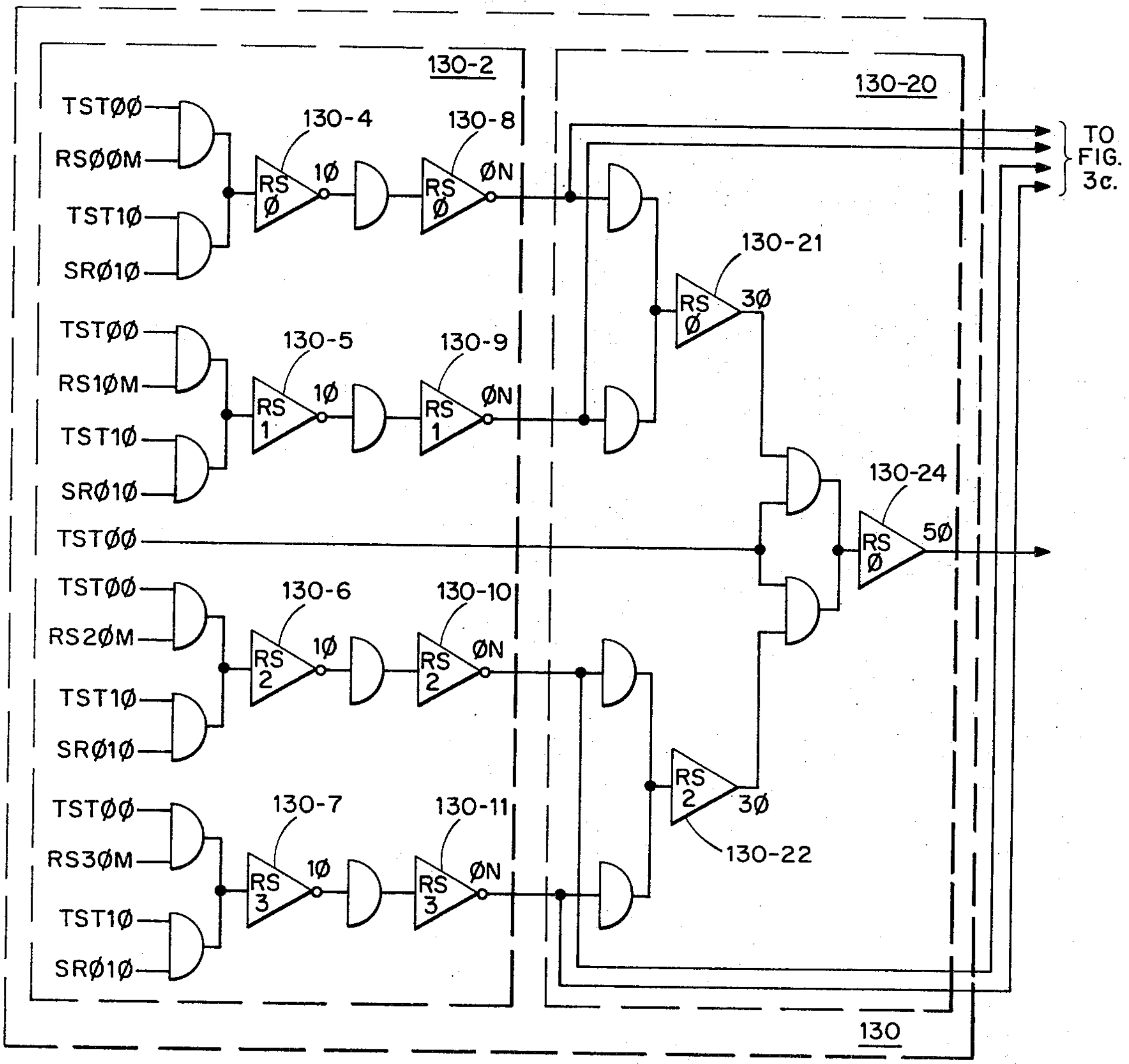

MERGE REQUEST TO SEND LOGIC SECTION - FIG. 3*g*

The section 130 is similar to section 125, has an input section 130-2 which combines the test control signals TSTϕϕ and TST1ϕ with different ones of the REQUEST TO SEND signals RSϕϕM through RS3ϕM generated by the terminal devices 110-1 through 110-4 respectively in addition to the REQUEST TO SEND signal SRϕ1ϕ generated by depressing control panel switch 165. The output signals generated by the plurality of gate and inverter circuits 130-4 through 130-7 and gate and inverter circuits 130-8 through 130-11 are logically combined by a pair of OR gate and amplifier circuits 130-21 and 130-22 included in Section 130-20. The output signals RSϕ3ϕ and RS23ϕ produced by circuits 130-21 and 130-22 are logically combined with test control signal TSTϕϕ by a further AND/OR gate and amplifier circuit 130-24 to produce an output signal RSϕ50. In this manner, whenever a REQUEST TO SEND signal is generated by any one of the terminal devices, indicative of the fact that the device is ready to begin actual transmission of the data (e.g., the device has data in an output register which it is ready to transmit), the multiplexer unit 100 forwards this signal to the Data Processing Unit 140 via the modem/adapter unit 120. The data is then transmitted by the Section 140 to the modem 120. When the multiplexer unit 100 is placed in the test mode, the signal TSTϕϕ inhibits unit 100 from forwarding a signal on the REQUEST TO SEND line to modem 120.

MERGE DATA SECTION - FIG. 3*h*

The section 140 includes the AND/OR gate and amplifier circuit 140-2, a gate and inverter circuit 140-4 and an AND/OR gate and amplifier circuit 140-6 arranged as shown. The section 140 combines the SEND DATA lines of each of the terminal devices with corresponding ones of the channel select signals within different AND gates. When a channel is connected (i.e., signal HLT1ϕ is a binary ONE), the section 140 forwards only the data signals originating from the appropriate terminal device to the data processing unit 128.

CLEAR TO SEND LOGIC SECTION - FIG. 3*i*

The section 135 includes a plurality of AND gate and amplifier circuits 135-1 through 135-4. These circuits combine a signal applied to the CLEAR TO SEND line by the modem 120 with each of the channel select signals for forwarding to the terminal devices 110-1 through 110-4. In operation, only the terminal device of a selectively connected channel receives a change in state in the signal applied to the CLEAR TO SEND line by modem 120 which initiates the application of data signals to the SEND DATA lines.

JUMPER CARD SECTION - FIG. 3*j*

The section 180 includes a jumper card which can be connected to operate in one of the four different modes illustrated in FIG. 3*j*. Normally, the jumper card is wired as card 180-1 which causes the multiplexer unit 100 to be operated via the modem 120 in an asynchronous (start-stop) transmission mode in which binary data is transferred serially between the terminal devices and communications channel without timing signals. When wired as the jumper card 180-2, data signals are transmitted between the terminal devices and the communications channel together with timing signals applied to the sets of lines 112-8 through 112-10 and 115-8 through 115-10 labeled SERIAL CLOCK RECEIVER, SERIAL CLOCK TRANSMITTER, and DIBIT CLOCK TRANSMITTER. The signals applied to these lines are then used to transfer information into the transmit and receive buffer registers of the terminal devices as shown in FIG. 2.

The jumper cards 180-3 and 180-4 illustrate arrangements similar to those mentioned with the exception that the multiplexer unit 100 directly connects to the communication adapter or control unit 126 of FIG. 1 thus bypassing the modems 120 and 124. In the synchronous data transmission arrangement (i.e., jumper card 180-4), the multiplexer unit 100 provides the timing signals which are normally provided by the modem to both the terminal devices and to the data processing unit. These signals are generated by the communications clock circuit 165 and divider 170 both of which may be conventional in design. The clock circuit 165 is operative to produce a square wave clocking signal having a pulse repetition frequency of 4,800 hertz. This signal is divided by two by circuit 170 to provide a clocking signal haing a pulse repetition frequency of 2,400 hertz.

SYSTEM OPERATION

Device Initiated Transaction

With reference to FIGS. 1, 2, and FIGS. 3*a* through 3*j*, the operation of the multiplexer unit 100 of FIG. 1 will now be described. It is assumed for the purpose of this first example that the terminal device 110-4 has data stored in its transmit buffer 110-4*a* which it is to transmit to the Data Processing Unit 128. Since the device is active, it has placed the DATA TERMINAL READY line in a binary ONE state (i.e., signal DR3$\phi$M is a binary ONE). The terminal device 110-4 signals the multiplexer unit 100 that it has information to transmit by forcing its REQUEST TO SEND line to a binary ONE state switching signal RS3$\phi$N to a binary ONE.

From FIG. 3*b*, it is seen that during normal operation (i.e., MODE and SCAN switches are in RUN position), signals from clock 205 advance the counter 210 through its various counts for scanning the four channels at a rate of thirty steps per second. When the counter advances to a count of six (i.e., signal AD310 is a binary ONE) following the change of state in the REQUEST TO SEND line, the latch circuit 225-25 of the Channel Select Latch Section of FIG. 3*c* switches to a binary ONE state (signal RS30N is a binary ONE).

The switched channel select latch circuit 225-25 conditions the Clock Halt Logic Circuit Section to inhibit the scanner unit 200 from further scanning. In particular, signal AD33$\phi$ conditions the gate circuits 150-2 and 150-4 to force control signal HLT2$\phi$ from a binary ONE to a binary ZERO. This in turn inhibits the gate and amplifier circuit 205-30 of FIG. 3*a* from generating further clocking signals.

Concurrent with the inhibiting of clock circuit 205, the multiplexer unit 100 inhibits the DATA SET READY lines to the other terminal devices (i.e., terminal devices 110-1 through 110-3). More specifically, it is seen from FIG. 3*f* that only the AND gate 145-4 of the Data Set Ready Line Control Section 145 is partially conditioned for operation. All other AND gates are inhibited from operation by signal AD34$\phi$ which is the complement of signal AD33$\phi$ and is in a binary ZERO state at this time. DATA SET READY line from the modem/adapter unit 120 is passed on only to the active terminal device 110-4 via the AND gate circuit 145-4 included within the Data Set Ready Line Control Section 145.

It is assumed that a telephone communications channel between the data processing unit 128 and the multiplexer unit 100 had been established in a conventional manner. For example, assuming that the data processing unit 128 originally initiated a call to the site of the terminal devices 110-1 through 110-4, it caused the modem 124 to initiate the dialing of the terminal device site through an automatic calling unit which in turn causes the generation of a ringing signal through conventional telephone apparatus, not shown. The data coupler, conventional in design, which can be assumed to be included within modem 120 indicates the receipt of the call to the modem 120 upon detecting the aforementioned ringing signal. The modem 120 includes logic circuits, conventional in design, which are operative to answer the call. The modem 120 answers the call by forcing the DATA TERMINAL READY line to binary ONE state. It will be seen from FIG. 2, that the modem 120 simply transmits the state of the DATA TERMINAL READY line which originates from the multiplexer unit 100.

As previously mentioned, the DATA TERMINAL READY line is forced to a binary ONE state when power is applied to the multiplexer unit 100. The coupler is operative to answer the call by requesting a data transmission path to a local telephone channel which establishes the connection between the local telephone line channel and the modem 120. Following this, the modem normally transmits the tone of a first frequency for a predetermined period of time sufficient to disable the echo suppressors and sufficient to answer the call initiated by the automatic calling unit of data processing unit 128.

When the calling unit of modem 124 detects the answering tone from the sending station modem 120, it switches the telephone channel 125 over to the control of the modem 124. Also, when the DATA TERMINAL READY line is in a binary ONE state, the calling unit included within modem 120 after answering the call forces the DATA SET READY line to a binary ONE signalling multiplexer unit 100 that the call has been answered and the telephone channel has been established between the processiing unit 128 and multiplexer unit 100.

In this example, the called station has initiated the transaction by causing the multiplexer unit 100 to force the REQUEST TO SEND line to a binary ONE state. This causes modem 120 to place the communications channel in a mark condition by transmitting a signal representative of a binary ONE, referred to as a "marking frequency".

When the modem 120 is ready to accept information for transmission over the telephone channel following the receipt of the change in state in the REQUEST TO SEND line, it forces the CLEAR TO SEND line to a binary ONE state. The Clear To Send Line Control Section 135 of multiplexer unit 100 responds by forwarding a change of state in this line to the active terminal device 110-4 signalling that it can transmit data. In particular, AND gate 135-1 of Section 135 is operative to force signal CS$\phi$1A to a binary ONE state when the signal CS$\phi$1$\phi$ applied to the CLEAR TO SEND line switches to a binary ONE (see FIG. 3*i*).

When the terminal device 110-4 detects the change in state in the CLEAR TO SEND line, it places itself in a transmit mode. This means that the terminal device 110-4 is operative to generate signals, by means not shown, for applying data signals stored in buffer 110-4a to the SEND DATA line. When the jumper card 110 is arranged to have the multiplexer unit 100 operate in a synchronous mode, (i.e., arranged as card 180-2 of FIG. 3*j*), the timing signals generated by the modem 120 (i.e., those applied to the SERIAL CLOCK TRANSMITTER line) are used to gate the data signals from buffer 110-4*a* onto the SEND DATA line connected to terminal device 110-4. The Merge Data Logic Circuit Section 140 of multiplexer unit 100 is then operative to transfer only those signals applied to the SEND DATA line by terminal device 110-4 to the modem 120 thereby completing a data channel path between the active terminal device and the data processing unit 128.

The above-mentioned data channel path is completed by the Merge Data Logic Circuit Section 140 illustrated in FIG. 3*h*. It is seen from that Figure that gate 140-2 switches state only in response to signal SD310 because channel select signal AD330 is a binary ONE. At the same time, the data signals of the other channels are inhibited as their corresponding channel select signals (i.e., signals ADφ3φ through AD23φ) are binary ZEROS. Accordingly, the resultant output signal SDφ6φ switches state only in response to the data signal SD31φ applied by terminal device 110-4.

The communications channel between active device 110-4 and data processing unit 128 remains open until terminal device 110-4 terminates transmission. Any well-known communications procedure may be used for signalling the termination of a transaction to the data processing unit 128. For example, this may be done by including an end of message character within the data being transmitted to be recognized by the data processing unit 128.

At the end of the transaction, the terminal device 110-4 is operative to force the DATA TERMINAL READY from a binary ONE line to a binary ZERO state for a predetermined period of time. This causes latch circuit 225-25 of FIG. 3*c* to be reset to its binary ZERO state. This in turn forces signal AD33φ to a binary ZERO state which conditions the logic circuits within the Clock Halt Logic Circuit Section 150 to switch control signal HLT2φ from a binary ZERO to a binary ONE state. This enables the clock 205 to again generate clocking signals which advance counter 210. Thus, the scanner 200 resumes its sequential scanning of the REQUEST TO SEND lines of terminal devices 110-1 through 110-4.

It will be noted from FIG. 2 that signals applied to the RECEIVE DATA line 115-5 of modem 120 are transmitted to the receive buffers of each of the terminal devices 110-1 through 110-4. Thus, following the completion of a transaction between device 110-4 and data processing unit 128, any other terminal device during this period which has received and decoded its address can gain access to the already established communication channel by forcing its REQUEST TO SEND line to a binary ONE state. The scanner 200 is then operative to establish a communication channel path between the active terminal device and the data processing unit 128 in the manner just described.

Processing Unit Initiated Transaction

The data processing unit 128 can initiate a transaction between it and any one of the terminal devices 110-1 through 110-4 by transmitting a message to modem 120 which includes the address the particular terminal device. For example, when the data processing unit 128 wants to communicate with device 110-1, it transmits an all ZERO address code within an appropriate calling message (e.g., during device polling or device selection). When the address circuits 110-1*c* detect the device address, they cause the terminal device 110-1 to force its REQUEST TO SEND line in addition to the DATA TERMINAL READY line from a binary ZERO to a binary ONE state. Assuming that no other REQUEST TO SEND lines are in a binary ONE state, the scanner 200 upon detecting the binary ONE state of the REQUEST TO SEND line of active device 110-1 is operative to initiate the same sequence of events just described in connection with a device-initiated transaction.

It will be noted that in either type of transaction, each time a terminal device signals the end of the transaction to the data processing unit 128 via modem 120, it also forces its REQUEST TO SEND line to a binary ZERO state which signals the end of transmission to the modem 120. Since the states of the REQUEST TO SEND lines of each of the terminal devices 110-1 through 110-4 are merged by Section 130, the modem 120 maintains communications until all of their REQUEST TO SEND lines are in a binary ZERO state indicative of the fact that no further data transmission is to take place between the terminal devices 110-1 through 110-4 and the data processing unit 128. When this happens, the modem 120 is operative to provide a "soft carrier turn-off" in which the carrier signal being transmitted over the telephone communications channel is shifted down in frequency toward a predetermined out of data band frequency.

As well known, the above arrangement avoids the possibility of generating line transients by abruptly terminating transmission which could result in errors being generated in the data received by the data processing unit 128. The multiplexer unit 100 can release the telephone communications channel either by forcing the REQUEST TO SEND line or the DATA TERMINAL READY line to a binary ZERO. As mentioned previously, the latter occurs when power is removed from the multiplexer unit 100. When either line is forced to a binary ZERO, the data coupler disconnects the multiplexer unit 100 from the telephone line.

From the foregoing description, it is seen that the invention provides an improved multiplexing apparatus which provides an easy and simple way of coupling a plurality of terminal devices to a modem or communications channel. The simplicity of construction allows the multiplexing apparatus to be tested quickly and efficiently by apparatus included within the multiplexing apparatus. Moreover, the simplicity of construction ensures reliable operation.

Because the multiplexing apparatus provides an interface which is the same as that of the devices, it has the advantages of simplicity of construction and is low in cost and operates in a manner which obviates the need for character recognition circuits. Also, simplicity and ease of construction is further enhanced by having the multiplexing apparatus couple directly to the input power source and use the power source signals to establish the rate at which the apparatus scans the input control lines of the terminal devices for activity. It has been found scanning at one half the rate of the input power source provides highly reliable operation without any loss in processing efficiency. Thus, the invention takes full advantage of the normally low speed transaction rate of the terminal devices. These terminal devices are normally operated by an operator and therefore transactions are entered at a rate which is handled efficiently using a multiple of the power line rate. By scanning at one half the input frequency, any possibility of overlap or interference is obviated.

It will be appreciated by those skilled that many changes may be made to the illustrated embodiment without departing from the spirit and scope of the invention.

While in accordance with the provisions and statutes there has been illustrated and described the best form of the invention known, certain changes may be made to the elements described without departing from the spirit of the invention as set forth in the appended claims and that in some cases certain features of the invention may be used to advantage without a corresponding use of other features.

Having described the invention, what is claimed as new and novel and for which it is desired to secure Letters Patent is:

1. A multiplexing apparatus for coupling a plurality of data terminal devices to a plurality of lines of a common interface for transmissions and reception of data over a communications channel, said multiplexing apparatus comprising:

channel control means, said control means including a plurality of bistable switching means, each connected to be coupled to a different one of said plurality of terminal devices, each of said plurality of bistable switching means being conditioned for switching to a predetermined state upon sensing both a request to send data signal and a data terminal ready signal indicating readiness to maintain connection to said communications channel for processing data from said different one of said plurality of terminal devices;

free running scanning means coupled to each of said plurality of bistable switching means, said scanning means being operative to generate signals to scan each of said bistable means for device requests, each of said plurality of bistable means switching to said predetermined state in response to signals from said scanning means when conditioned by said send data and data terminal ready signals, and sensing means being coupled to said plurality of bistable means and being operative in response to any one of said bistable means being switched to said predetermined state to inhibit further scanning by said scanning means; and, signal transfer means coupled to said terminal devices and to said bistable switching means, said transfer means being conditioned by said plurality of bistable switching means to selectively couple to said lines of said interface only a device coupled to said bistable switching means in said predetermined state for said transmission and reception of data without requiring detection of special control information by said multiplexing apparatus.

2. The apparatus of claim 1 wherein said scanning means includes a free running clocking means and input power source means for receiving input power signals, said clocking means being coupled to said source means and being arranged to be switched at a rate corresponding to the frequency of said input power signals.

3. Apparatus of claim 2 wherein said multiplexing apparatus further includes mode control means coupled to said clocking means, said mode control means including logic gating means for receiving a control signal, said logic gating means being operative in response to said control signal to inhibit said clocking means from enabling the operation of said scanning means.

4. The apparatus of claim 3 wherein said mode control means further includes first manual switching means coupled to said logic gating means, said manual switching means being operative when switched to a predetermined state to generate said control signal.

5. The apparatus according to claim 3 wherein said mode control means further includes pulse generating means coupled to said logic gating means and operative to generate a timing signal, said clocking means being conditioned by said control signal to advance said scanning means a step at a time in response to each occurrence of said timing signal.

6. The apparatus of claim 5 wherein said pulse generating means includes manual switching means coupled to said logic means, said manual switching means being operative when switched to generate said timing signal.

7. The apparatus of claim 1 wherein said scanning means includes counting means and decoding means coupled to said counting means, said decoding means being arranged to decode predetermined counts from signals generated by said counting means for conditioning each of said channel bistable means to be switched only during nonoverlapping time intervals defined in accordance with said predetermined counts.

8. The apparatus of claim 7 wherein said counting means is a binary counter and said predetermined counts correspond to alternate counts of said counter.

9. The apparatus of claim 1 wherein said multiplexing means further includes data receiving means coupled to at least a predetermined one of said plurality of lines of said interface and individually of each of said terminal devices for transferring information received from said predetermined one of said interface lines to each of said terminal devices and wherein said plurality of devices each includes address control means for sensing when said information includes a predetermined address code assigned to one of said plurality of devices for initiating a data transfer operation, said address control means being operative in response to said address code to generate said request signal to switch a corresponding one of said bistable means to said predetermined state.

10. The apparatus of claim 1 further including control means coupled to said common interface and individually to each of said plurality of devices, said control means including:

a plurality of gating means, corresponding in number to said plurality of devices and each being coupled to a different one of said plurality of terminal devices, each of said gating means being connected to receive a signal from a predetermined one of said plurality of lines of said common interface indicating when said interface is connected to said communications channel and each of said gating means being coupled to predetermined ones of said plurality of bistable means, each said gating means being conditioned by said predetermined ones of said plurality of bistable means to apply said signal only to the device which is to transmit data to said interface.

11. The apparatus of claim 1 wherein each of said bistable devices are coupled to said associated terminal devices and each are arranged to be switched from said predetermined state to a reset state by the terminal device associated therewith inhibiting generating said data terminal ready signal signalling readiness to disconnect said connection to said communications channel at the completion of processing data.

12. A communication system comprising:

a communication interface including a plurality of data and control interface lines operatively coupled to transmit and receive information signals over a communications channel;

a plurality of terminal devices, each device being connected to a plurality of lines corresponding in number and kind to said data and control lines for transmission and reception of binary information signals to and from said interface lines; and, multiplexing means being operatively coupled to each said plurality of lines of said plurality of terminal devices and to said plurality of interface lines of said communications interface, said multiplexing apparatus including:

channel select means operatively coupled to each of said plurality of terminal devices, said select means including a plurality of bistable means, each of said bistable means being coupled to first and second control lines of each said plurality of lines from a different one of said plurality of terminal devices;

free running counting means coupled to said channel select means, said counting means being operative to generate signals for selecting different ones of said plurality of bistable means in sequence, each of said bistable means selected being operative to switch to a predetermined state in response to signals being applied to both said first and second control lines by a terminal device associated therewith, said counting means including means responsive to any one of said bistable means being switched to said predetermined state to inhibit generating of said signals; and, data transfer means coupled to a data line of each said said plurality of lines terminal devices and to said channel select means, said data transfer means including output means coupled to a corresponding one of said data lines of said plurality of lines of said communications interface, said data transfer means being operative in response to one of said plurality of bistable means being switched to said predetermined state to enable the transmission of information signals from the device coupled to said one of said bistable means to said communications channel without requiring detection of special characters by said multiplexing means.

13. The system of claim 12 wherein said free running counting means includes free running clockwise means and input power source means for receiving input power signals, said clocking means being coupled to said source means and being arranged to be switched at a rate corresponding to the frequency of said input power signals.

14. The system of claim 13 wherein said multiplexing means further includes mode selection means coupled to said clocking means, said mode selection means including logic gating means for receiving a test signal, said logic gating means being operative in response to said test signal to inhibit said clocking means from enabling the cycling of said counting means.

15. The system of claim 12 wherein said counting means includes decoding means coupled to each of said plurality of bistable means, said decoding means being operative in response to signals representative of predetermined counts from said counting means to generate said signals for selecting each of said bistable means in sequence only during nonoverlapping time intervals defined in accordance with signals representative of said predetermined counts.

16. The system of claim 15 wherein said counting means including a binary counter and said predetermined counts correspond to alternate counts of said counter.

17. The system of claim 12 wherein any one of said bistable devices switched to said predetermined state is conditioned to be switched to a reset state in response to a change of state in a predetermined one of said first and second control lines by the terminal device associated therewith signalling nonreadiness to transmit data.

18. The system of claim 12 wherein said multiplexing means includes control means coupled to a predetermined one of said control lines of said plurality of interface lines of said communications interface, said control means including a plurality of gating means, each being coupled to a third control line coupled to a different one of said plurality of terminal devices, each of said plurality of gating means being coupled to a different one of said plurality of bistable means and each of said gating means being enabled prior to said transmission by a change of state in said predetermined one of said control lines to apply said change of state only to said third line coupled to one of said devices when each said different one of said plurality of bistable means is in said predetermined state signalling to said one device that information can be transmitted across said data lines of said plurality of lines of said communications interface.

19. The system of claim 12 wherein said multiplexing means further includes:

data set ready control means coupled to a predetermined control line of said plurality of lines of said communications interface, said data set ready control means including a plurality of logic gating means corresponding in number to said plurality of devices, each of said plurality of gating means being coupled to predetermined ones of said plurality of said bistable means and to another control line of a different one of said plurality of lines of ones of said terminal devices, each of said gating means being responsive to a change of state in said another control line to transmit said change of state only to one of said plurality of devices designated by the states of said predetermined ones of said plurality of bistable means.

20. The system of claim 12 wherein said multiplexing means includes logic gating means coupled to a predetermined one of each of said first and second control lines of said plurality of lines and to a predetermined one of control interface lines of said plurality of lines of said communications interface, said logic gating means being operative in response to a change of state in said any one of said predetermined one of said first and second control lines to transmit said change of state to said predetermined one of said control interface lines.

21. The system of claim 20 wherein said logic gating means includes:

a plurality of input gating means each being connected to receive one of said predetermined one of said first and second control lines and a bilevel test control signal, and output gating means coupled to said plurality of input gating means, each of said input gating means being conditioned by a predetermined level of said test control signal to inhibit said output gating means for applying said change of state to said predetermined one of said control interface lines.

22. The system of claim 21 wherein each of said input gating means is coupled to different ones of said bistable means and includes means for receiving a manually generated control signal, and each of said input gating means being conditioned by said predetermined level of said test control signal to transmit said manually generated control signal to said predetermined one of said first and second control lines in place of the signal applied to said predetermined one of said first and second control lines by the terminal device associated therewith.

23. A multiplexing system for selectively coupling a plurality of input/output terminal devices to a communications channel through a common communications interface comprising a plurality of lines for bidirectional data transmission said plurality of lines of said interface including a plurality of input and output control and data interface lines and said system comprising:

a plurality of sets of input and output data and control lines, a different one of said plurality of input-/output terminal devices being coupled to a different one of said plurality of sets of input and output data and control lines; and, multiplexing control apparatus including:

scanning means having a plurality of states for selecting different ones of a plurality of channels for interconnecting corresponding ones of said plurality of terminal devices to said plurality of lines of said common interface, said scanning means including counter means connected to be cycled repetitively to generate signals representative of said plurality of states, and channel select means coupled to said counter means and individually to first and second control output lines of each of said plurality of sets of input and output data and control lines, said channel select means including a plurality of bistable storage means corresponding in number to said plurality of channels, each of said a channel as being coupled to said first and second control outlet lines of a different set of said plurality of sets of control lines and each of said a channel as being conditioned by signals from said counter means designating a predetermined one of said channels to be switched to a predetermined state by a corresponding one of said plurality of terminal devices; and, a plurality of gating means, a first one of said gating means being coupled to a data output interface line and to a data output line of each of said plurality of sets of input and output data and control lines, a second one of said gating means being coupled to a first output interface control line and to a first input control line of each of said plurality of sets of input and output data and control lines, and a third one of said gating means being coupled to a second output interface control line and to a second input control line of each of said plurality of sets of input and output data and control lines, each of said first, second and third gating means connected to be conditioned by said channel select means when one of said plurality of a channel as switch to said predetermined state to connect only the set of data and control lines of the terminal device connected to channel designated by said one of said plurality of a channel as connected to corresponding ones of said data and control interface lines enabling the transfer of data signals between said set of lines and said interface lines without requiring detection of characters by said multiplexing control apparatus.

24. The system of claim 23 wherein said free running counting means includes free running clocking means and input power source means for receiving input power signals, said clocking means being coupled to said source means and being arranged to be switched at a rate corresponding to the frequency of said input power signals.

25. The system of claim 24 wherein said counting means includes decoding means coupled to each of said plurality of bistable storage means, said decoding means being operative in response to signals representative of predetermined states from said counting means to generate said signals for selecting each of said bistable storage means in sequence only during nonoverlapping time intervals defined in accordance with said predetermined states.

26. The system of claim 25 wherein said counting means including a binary counter and said predetermined states correspond to alternate counts of said counter.

27. The system of claim 24 wherein any one of said bistable storage devices switched to said predetermined state is conditioned to be switched to a reset state in response to a change of state in a predetermined one of said first and second control lines by the terminal device associated therewith signalling nonreadiness to transmit data.

* * * * *

UNITED STATES PATENT OFFICE
CERTIFICATE OF CORRECTION

Patent No. 3,826,872 Dated July 30, 1974

Inventor(s) William W. MacGregor

It is certified that error appears in the above-identified patent and that said Letters Patent are hereby corrected as shown below:

Column 15, line 20, delete "transmissions" and insert --transmission--.

Column 16, line 35, delete "of" (second occurrence) and insert --to--.

Column 17, line 54, delete "clockwise" and insert --clocking--.

Column 19, line 28, after "transmission" insert --,--.

Column 19, line 51, delete "a".

Column 19, line 52, delete "channel as" and insert --bistable storage means--.

Column 19, line 53, delete "outlet" and insert --output--.

Column 19, line 54, delete "a channel as" and insert --bistable storage means--.

Column 20, line 18, delete "a channel as" and insert --bistable storage means--.

Column 20, line 19, delete "switch" and insert --switches--.

Column 20, line 21, before "designated" insert --as--.

UNITED STATES PATENT OFFICE

CERTIFICATE OF CORRECTION

Patent No. 3,826,872 Dated July 30, 1974

Inventor(s) William W. MacGregor

It is certified that error appears in the above-identified patent and that said Letters Patent are hereby corrected as shown below:

Column 20, line 22, delete "a channel as" and insert -bistable storage means--.

Signed and sealed this 5th day of November 1974.

(SEAL)
Attest:

McCOY M. GIBSON JR.
Attesting Officer

C. MARSHALL DANN
Commissioner of Patents